US009488103B2

(12) United States Patent
Suciu et al.

(10) Patent No.: US 9,488,103 B2
(45) Date of Patent: Nov. 8, 2016

(54) VARIABLE CYCLE INTAKE FOR REVERSE CORE ENGINE

(71) Applicant: UNITED TECHNOLOGIES CORPORATION, Hartford, CT (US)

(72) Inventors: Gabriel L Suciu, Glastonbury, CT (US); Jesse M Chandler, South Windsor, CT (US); Joseph B Staubach, Colchester, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 330 days.

(21) Appl. No.: 14/142,966

(22) Filed: Dec. 30, 2013

(65) Prior Publication Data
US 2014/0260183 A1 Sep. 18, 2014

Related U.S. Application Data

(60) Provisional application No. 61/781,778, filed on Mar. 14, 2013.

(51) Int. Cl.
| F02C 7/057 | (2006.01) |
| F02C 7/042 | (2006.01) |
| B64D 33/02 | (2006.01) |
| F02C 7/055 | (2006.01) |
| F02C 7/052 | (2006.01) |
| F02K 3/077 | (2006.01) |
| B64D 27/20 | (2006.01) |
| F02C 3/10 | (2006.01) |

(52) U.S. Cl.
CPC .............. *F02C 7/057* (2013.01); *B64D 33/02* (2013.01); *F02C 7/042* (2013.01); *B64D 27/20* (2013.01); *B64D 2033/0286* (2013.01); *F02C 3/10* (2013.01); *F02C 7/052* (2013.01); *F02C 7/055* (2013.01); *F02K 3/077* (2013.01); *F05D 2250/314* (2013.01)

(58) Field of Classification Search
CPC ........ F02C 7/042; F02C 7/057; F02K 3/077; F02K 7/16; B64D 27/14; B64D 27/16; B64D 27/20; B64D 29/04; B64D 33/02; B64D 2033/0286
See application file for complete search history.

(56) References Cited

U.S. PATENT DOCUMENTS

| 2,334,561 | A | | 11/1943 | Kopplin | |
| 3,131,536 | A | | 5/1964 | Snell | |
| 3,289,414 | A | * | 12/1966 | Kutney | F02K 7/16 60/263 |
| 3,318,095 | A | * | 5/1967 | Snell | B64C 29/0066 60/224 |
| 3,368,352 | A | * | 2/1968 | Colin | F02K 3/025 60/224 |

(Continued)

FOREIGN PATENT DOCUMENTS

EP 0426500 A1 5/1991

OTHER PUBLICATIONS

Norris, G. and Warwick, G., "A Reversed, Tilted Future for Pratt's Geared Turbofan?", Aviation Week & Space Technology, Mar. 26, 2015.*

*Primary Examiner* — Lorne Meade
(74) *Attorney, Agent, or Firm* — Bachman & LaPointe, P.C.

(57) ABSTRACT

A gas generator for a reverse core engine propulsion system has a variable cycle intake for the gas generator, which variable cycle intake includes a duct system. The duct system is configured for being selectively disposed in a first position and a second position, wherein free stream air is fed to the gas generator when in the first position, and fan stream air is fed to the gas generator when in the second position.

26 Claims, 7 Drawing Sheets

(56) References Cited

U.S. PATENT DOCUMENTS

| | | | | |
|---|---|---|---|---|
| 3,635,029 A | * | 1/1972 | Menioux | F02K 3/075 60/224 |
| 3,667,703 A | | 6/1972 | Boek | |
| 3,719,428 A | * | 3/1973 | Dettmering | F02C 7/04 415/147 |
| 4,052,845 A | * | 10/1977 | Tumavicus | F02K 3/075 137/625.44 |
| 4,193,262 A | * | 3/1980 | Snell | F02C 7/32 60/262 |
| 4,397,431 A | | 8/1983 | Ben-Porat | |
| 5,284,014 A | * | 2/1994 | Brossier | F02K 7/16 60/225 |
| 5,694,768 A | * | 12/1997 | Johnson | F02K 3/075 60/226.3 |
| 6,260,800 B1 | * | 7/2001 | Snell | B64C 3/50 244/53 R |
| 6,415,597 B1 | * | 7/2002 | Futamura | F02C 6/02 60/224 |
| 7,140,174 B2 | * | 11/2006 | Johnson | F02C 7/042 60/226.1 |
| 7,237,378 B2 | | 7/2007 | Lardellier | |
| 8,176,725 B2 | | 5/2012 | Norris et al. | |

* cited by examiner

VARIABLE CYCLE INTAKE FOR REVERSE CORE ENGINE

CROSS REFERENCE TO RELATED APPLICATION(S)

This application claims the benefit of provisional application Ser. No. 61/781,778, filed Mar. 14, 2013.

STATEMENT OF GOVERNMENT INTEREST

The Government of the United States of America may have rights in the present invention as a result of NASA Cooperative Agreement Contract No. NNX11AB35A and Sub-Contract No. MIT/PW Subaward No. 5710002937 awarded by NASA.

BACKGROUND

The present disclosure is directed to a variable cycle intake for a propulsion system having a reverse core engine, which variable cycle intake has a first position for supplying free stream air to an inlet of the engine and a second position for supplying fan stream air to the inlet of the engine.

Typical multi-spool turbofan engines include a nested core, in which a high pressure, or core, spool is nested inside a low pressure spool. Such a nested core engine includes, in axial sequence, a low pressure compressor, a high pressure compressor, a combustor section, a high pressure turbine, and a low pressure turbine. The high pressure compressor is connected to the high pressure turbine with a high pressure shaft that extends through the combustor section. The low pressure compressor is connected to the low pressure turbine with a low pressure shaft that extends through the high pressure shaft. Increases in efficiency of the turbofan allow for the core to be reduced in size, such as by having a smaller diameter. The low pressure shaft, however, cannot be reduced in diameter because the rotational speeds of the low pressure spool are limited by critical speed. The shaft critical speed is proportional to the shaft diameter and inversely proportional to the shaft length. Thus, decreasing the shaft diameter with reduced core sizes is not possible without reducing the shaft length if the same critical speed is desired. Thus, reductions in the core size yields compromises in the high pressure spool to accommodate low pressure spool shaft diameters. For example, the size and weight of high pressure spool rotor disk need to be increased to accommodate openings for larger low pressure shaft sizes. As such, there is a need for improving engine architectures to allow for, among other things, decreased core sizes resulting from more efficient turbofan engines.

There has been proposed a gas turbine engine comprising a fan drive gear system, a low spool connected to the fan drive gear system, and a high spool disposed aft of the low spool. The low spool comprises a rearward-flow low pressure compressor disposed aft of the fan drive gear systems, and a forward flow low pressure turbine disposed aft of the low pressure compressor. The high spool comprises a forward flow high pressure turbine disposed aft of the low pressure turbine, a combustor disposed of aft of the high pressure turbine, and a forward-flow high pressure compressor disposed aft of the combustor.

One issue faced by designers of these new engine architectures is incorporation of the new engine architecture into an aircraft.

SUMMARY

In accordance with the present disclosure, there is provided a gas generator for a reverse core propulsion system, which broadly comprises a variable cycle intake for the gas generator, said variable cycle intake comprising a duct system which is configured for being selectively disposed in a first position and a second position, wherein free stream air is fed to the gas generator when in the first position and fan stream air is fed to the gas generator when in a second position.

In another and alternative embodiment, the duct system includes a free stream air inlet, a duct extending from the free stream air inlet, a slidable duct, a curved duct segment, and an outlet duct section.

In another and alternative embodiment, the slidable duct moves between a first position where the slidable duct communicates with the curved duct segment and a second position where the slidable duct is out of communication with the curved duct segment.

In another and alternative embodiment, the slidable duct surrounds a portion of the duct extending from the free stream air inlet.

In another and alternative embodiment, the curved duct segment surrounds a portion of the outlet duct section.

In another and alternative embodiment, the outlet duct section supplies one of free stream air and fan stream air to the gas generator.

In another and alternative embodiment, the outlet duct section is connected to an inlet of the gas generator.

In another and alternative embodiment, the gas generator further comprises a fan stream air inlet duct.

In another and alternative embodiment, the curved duct segment is moved from a free air stream position in contact with the slidable duct and out of contact with the fan stream air inlet duct to a fan air stream position in contact with the fan stream air inlet duct and out of contact with the slidable duct.

In another and alternative embodiment, the gas generator further comprises an actuator to move the curved duct segment from the free air stream position to the fan stream air position and from the fan stream air position to the free air stream position.

In another and alternative embodiment, the actuator has a first arm connected to a first surface of the curved duct segment and a second arm connected to a second surface of the curved duct segment.

In another and alternative embodiment, the gas generator further comprises a first link connected to the first surface of the curved duct segment and to a first surface of the slidable duct and a second link connected to the second surface of the curved duct segment and to a second surface of the slidable duct to move the slidable duct as the curved duct segment moves.

In another and alternative embodiment, the gas generator further comprises a particle separator connected to the free stream air inlet.

In another and alternative embodiment, the gas generator further comprises a cover plate for covering the free stream air inlet when the variable cycle intake is in the second position.

Further in accordance with the present disclosure, there is provided an aircraft which broadly comprises a fuselage having a tail section; a pair of gas generators located in the tail section; each of the gas generators having a variable cycle intake for supplying one of free stream air and fan stream air to a respective one of the gas generators; and variable cycle intake comprising a duct system which feeds free stream air to the respective one of the gas generators when in a first position and which feeds fan stream air to the respective one of the gas generators when in a second position.

In another and alternative embodiment, the duct system includes a free stream air inlet, a duct extending from the free stream air inlet, a slidable duct, a curved duct segment, and an outlet duct section.

In another and alternative embodiment, the slidable duct moves between a first position where the slidable duct communicates with the curved duct segment and a second position where the slidable duct is out of communication with the curved duct segment.

In another and alternative embodiment, the slidable duct surrounds a portion of the duct extending from the free stream air inlet.

In another and alternative embodiment, the curved duct segment surrounds a portion of the outlet duct section.

In another and alternative embodiment, the outlet duct section supplies one of free stream air and fan stream air to the respective one of the gas generators.

In another and alternative embodiment, each of the gas generators comprises a reverse core engine and the outlet duct section is connected to an inlet of the respective one of the gas generator.

In another and alternative embodiment, the duct system further comprises a fan stream air inlet duct.

In another and alternative embodiment, the curved duct segment is moved from a free air stream position in contact with the slidable duct and out of contact with the fan stream air inlet duct to a fan air stream position in contact with the fan stream air inlet duct and out of contact with the slidable duct.

In another and alternative embodiment, the duct system further comprises an actuator to move the curved duct segment from the free air stream position to the fan stream air position and from the fan stream air position to the free air stream position.

In another and alternative embodiment, the actuator has a first arm connected to a first surface of the curved duct segment and a second arm connected to a second surface of the curved duct segment.

In another and alternative embodiment, the duct system further comprises a first link connected to the first surface of the curved duct segment and to a first surface of the slidable duct and a second link connected to the second surface of the curved duct segment and to a second surface of the slidable duct to move the slidable duct as the curved duct segment moves.

In another and alternative embodiment, the duct system further comprises a particle separator connected to the free stream air inlet.

In another and alternative embodiment, the duct system further comprises a cover plate for covering the free stream air inlet when the variable cycle intake is in the second position.

In another and alternative embodiment, the duct system is at least partially embedded within an aerodynamic fairing.

In another and alternative embodiment, the aircraft further comprises a pair of free turbines and a pair of fans fan driven by said free turbines, wherein said gas generators provide air for driving said pair of free turbines.

Other details of the variable cycle intake for reverse core engines are set forth in the following detailed description and the accompanying drawings wherein like reference numerals depict like elements.

DETAILED DESCRIPTION

Figure 1A:
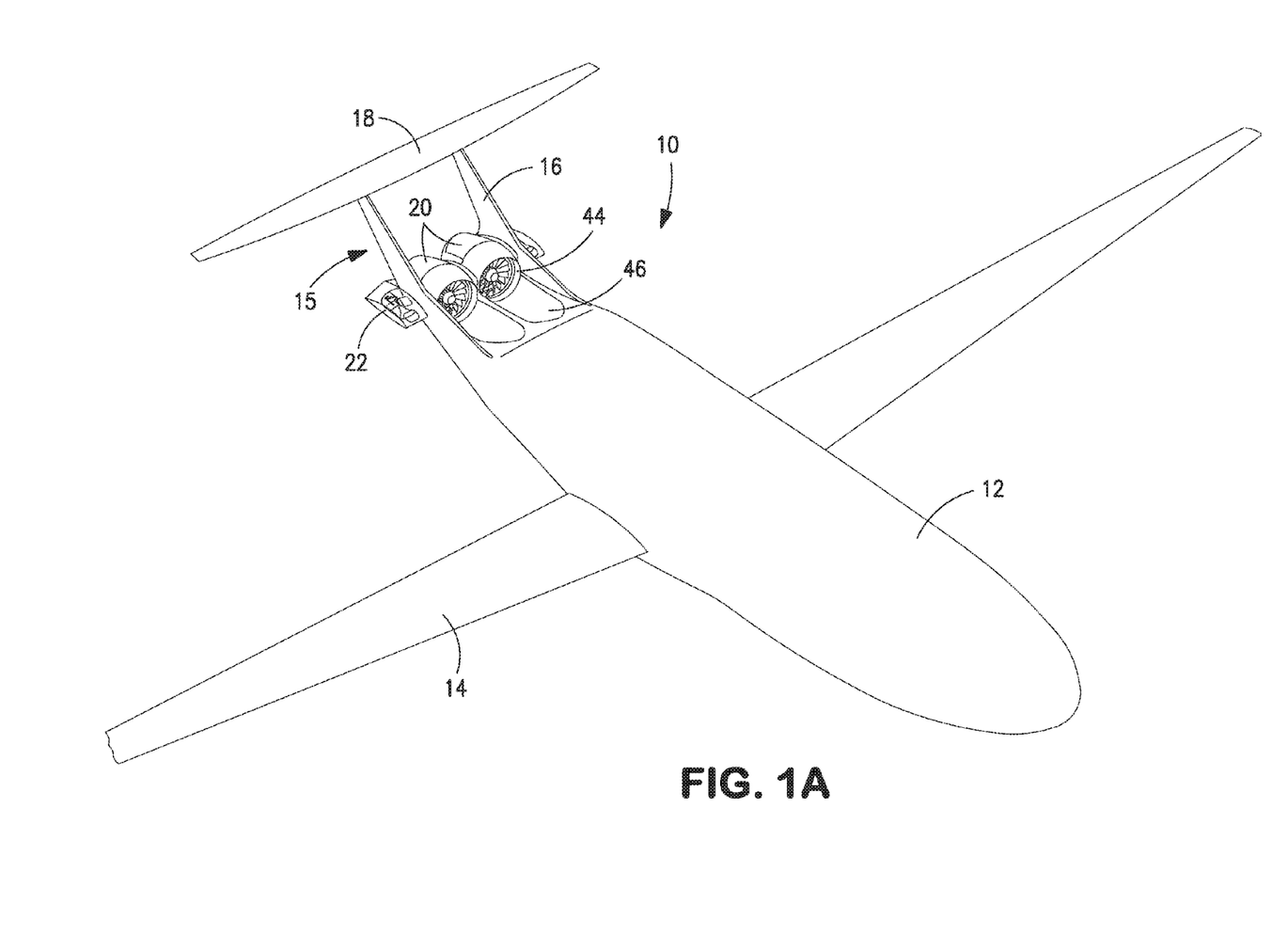
FIG. 1A is a schematic representation of an aircraft having a propulsion system with two gas generators in the form of reverse core engines.
Figure 1B:
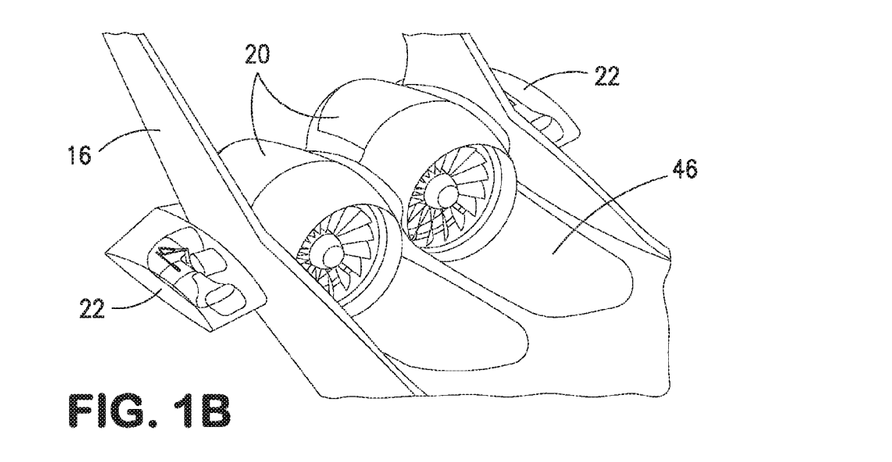
FIG. 1B illustrates a portion of the tail section of the aircraft of FIG. 1A.

FIGS. 1A and 1B illustrate an aircraft 10 having a fuselage 12, wings 14, and a tail 15 having vertical tail surfaces 16 and a tail wing 18 mounted to the tail surfaces 16. A propulsion system having a pair of propulsors 20, which are gas turbine engines, is mounted to the fuselage 12 at the base of the tail 15. The inlet 44 to each of the propulsors 20 includes a channel 46 in the fuselage 12 for delivering atmospheric air to the propulsors 20. An aerodynamic fairing 22 may extend from each side of the fuselage 12 adjacent the tail 15.

Figure 2:
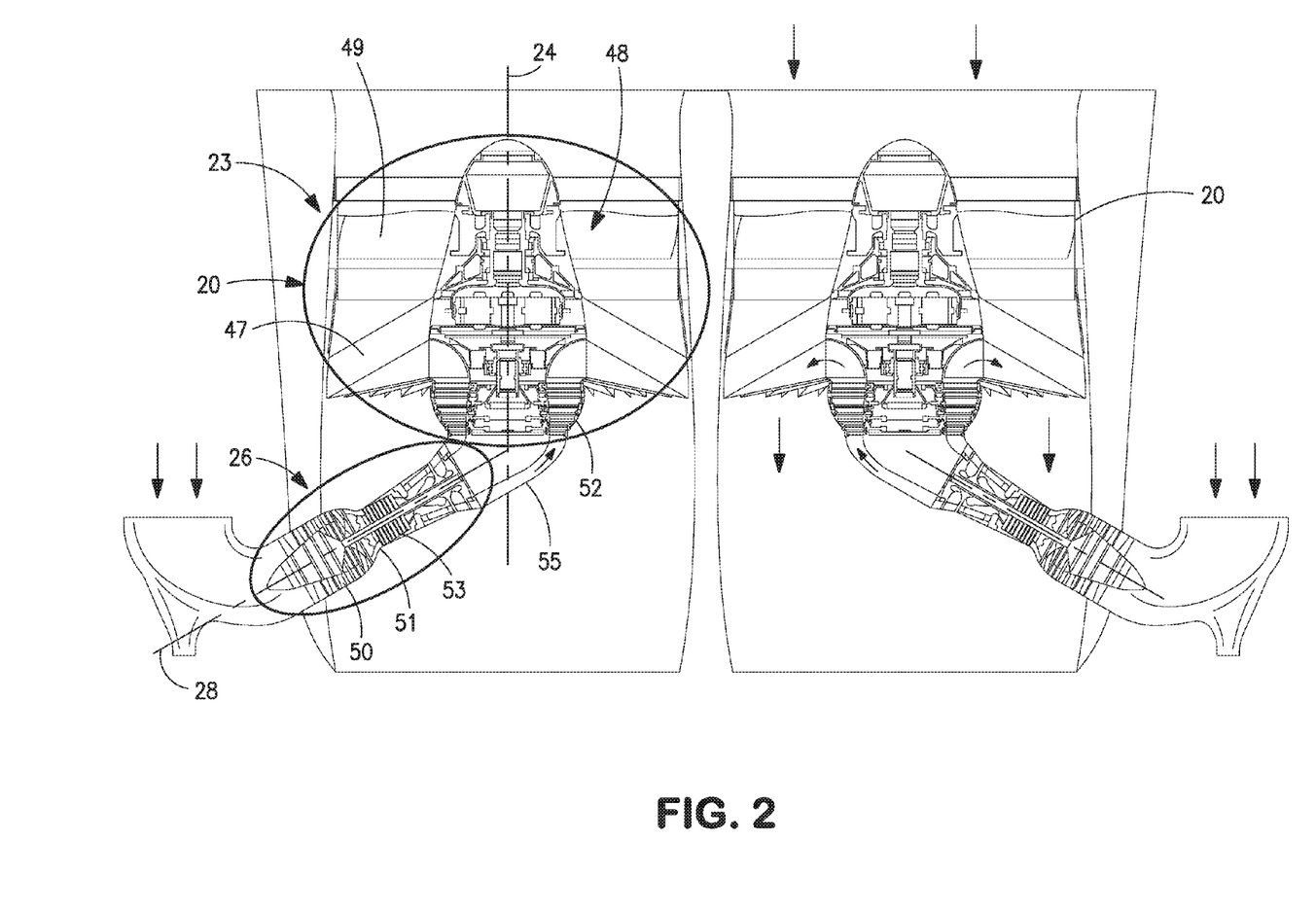
FIG. 2 is a sectional view of the propulsion system for propelling the aircraft of FIG. 1.

Referring now to FIG. 2, each of the propulsors 20 may comprise a propulsor section 23 which has a free turbine 52, a fan 48 having a plurality of fan blades 49 which is driven by the free turbine 52, and a plurality of fan exit guide vanes 47. The free turbine 52 and the fan 48 rotate about a central axis 24. Each of the propulsors 20 further has a gas generator 26 which has a longitudinal axis or central axis 28 which is at an angle to the fan central axis 24.

The illustrated gas generator 26 is a reverse core engine which includes a compressor section 50 having one or more stages such as a low pressure compressor and a high pressure compressor, a combustion section 51 having one or more combustors, and a turbine section 53 having one or more stages such as a low pressure turbine and a high pressure turbine. The low pressure compressor in the gas generator 26 is driven by a low pressure turbine via a low pressure spool and a high pressure compressor in the gas generator 26 is driven by a high pressure turbine via a high pressure spool. The gas generator 26 delivers combusted fluid to the free turbine 52, for driving same, via a plenum 55 connected to the outlet of the gas generator 26. The free turbine 52 drives the fan 48.

Figure 3:
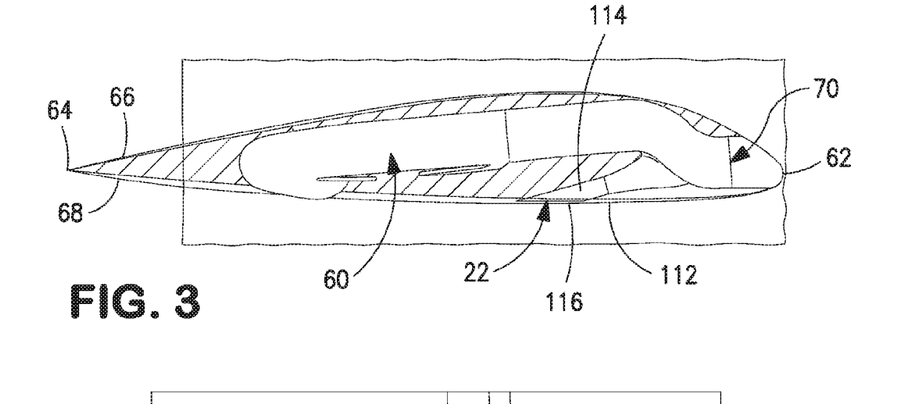
FIG. 3 is a sectional view of a fairing having the variable cycle intake embedded therein.

Referring now to FIG. 3, there is shown a variable cycle air intake 60 which is at least partially embedded within the aerodynamic fairing 22. As can be seen from FIG. 3, the aerodynamic fairing has a leading edge 62, a trailing edge 64, an upper aerodynamic surface 66, and a lower aerodynamic surface 68.

Figure 4:
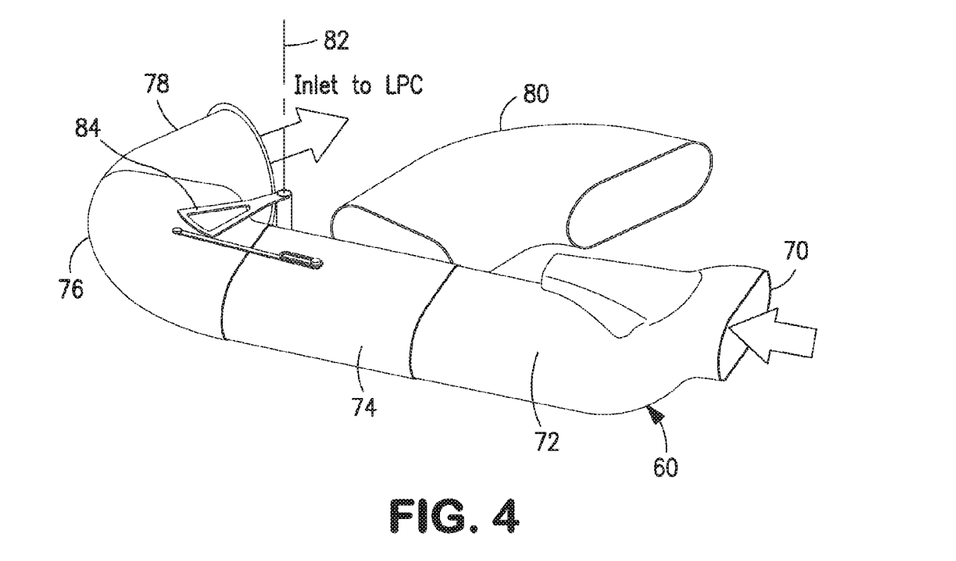
FIG. 4 is a schematic representation of the variable cycle intake in a first position where free stream air is supplied to a gas generator.
Figure 5:
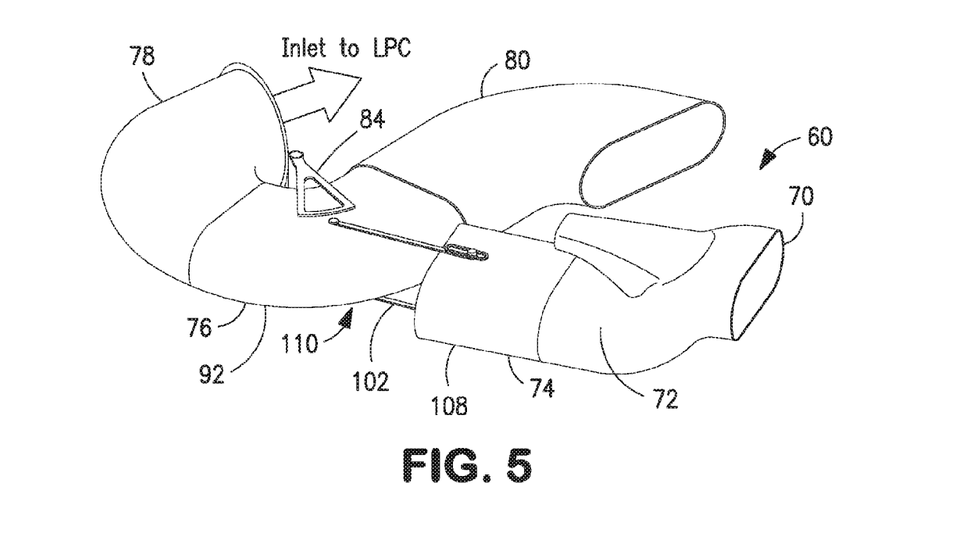
FIG. 5 is a schematic representation of the variable cycle intake of FIG. 4 in a second position where fan stream air is supplied to the gas generator.

Referring now to FIGS. 4 and 5, the variable cycle intake 60 has a duct system which includes a free stream air inlet 70, a duct 72 extending from the air inlet 70, a slidable duct section 74 which surrounds a portion of the duct 72 and which moves relative to the duct 72, a curved duct segment 76, and an outlet duct section 78 which connects to an inlet of a low pressure compressor section of the gas generator 26.

The curved duct segment 76 overlaps and surrounds a portion of the outlet duct section 78. The curved duct segment 76 is movable relative to the outlet duct section 78 between a first position (see FIG. 4) and a second position (see FIG. 5). In the first position, the curved duct segment 76 is in communication with the slidable duct section 74. In the second position (see FIG. 5), the curved duct segment 76 is in communication with a fan stream air inlet duct 80.

Figure 6A:
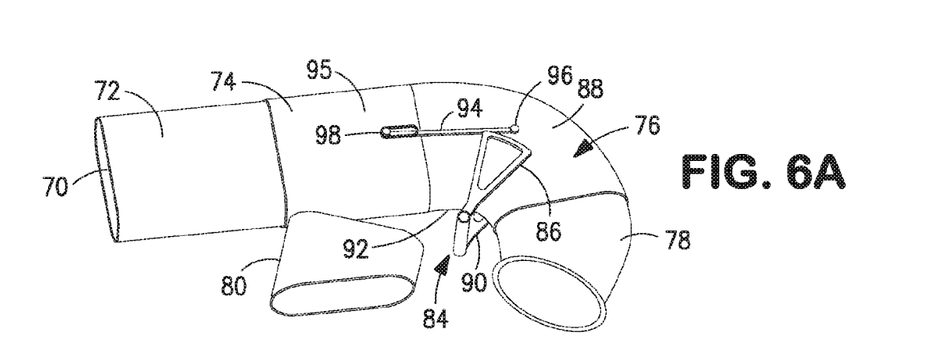
FIGS. 6A-6C are schematic representation of the variable cycle intake as it moves from the first position to the second position.
Figure 6B:
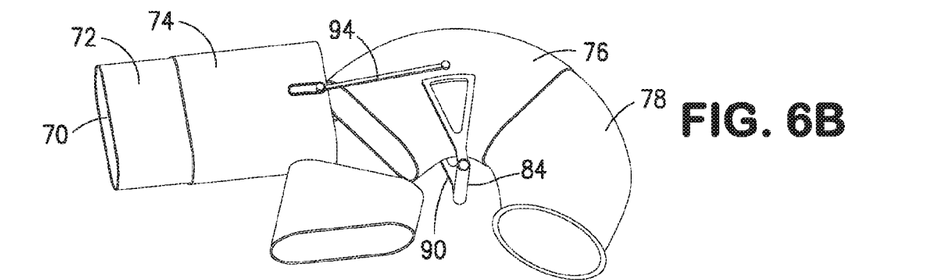
Figure 6C:
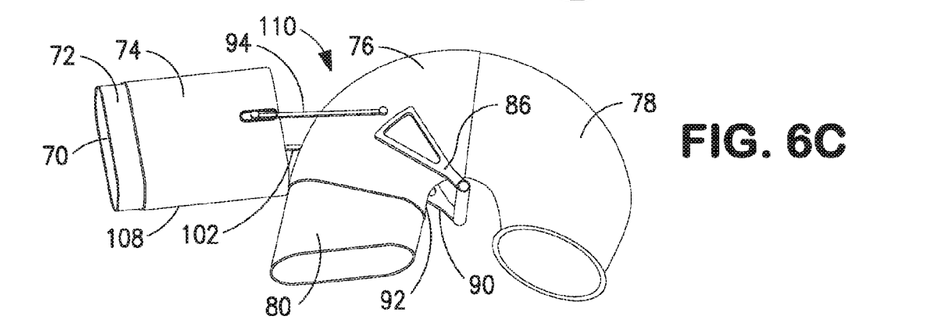

As can be seen from FIGS. 4 and 5, the curved duct segment 76 is rotated about an axis 82 by a U-shaped actuator 84. As shown in FIGS. 6A-6C, the U-shaped actuator 84 has a first arm 86 connected to a first surface 88 of the curved duct segment 76 and a second arm 90 connected to a second surface 92 of the curved duct segment 76. The actuator 84 may be rotated about the axis 82 by a motor (not shown) or any other suitable power source.

An upper link 94 is connected at a first end 96 to the first surface 88 of the curved duct segment 76. At a second end 98, the upper link 94 is connected to a first surface 95 of the slidable duct section 74. As shown in FIG. 5, a lower link 102 is connected to at a first end to the second surface 92 of the curved duct segment 76. At a second end, the lower link 102 is connected to a second surface 108 of the slidable duct section 74.

Referring now to FIGS. 6A-6C, as the actuator 84 rotates about the axis 82 towards the air inlet 70, the rotation of the actuator causes the slidable duct section 74 to move from a first free stream air position to a second fan stream position. In the first free stream position the slidable duct section 74 is in contact with the curved duct segment 76. In the second fan stream position, the duct 74 is out of contact with the curved duct segment 76.

When moving from the first position to the second position, the slidable duct section 74 moves relative to the duct 72 by siding in a direction toward the air inlet 70 and assume the position shown in FIG. 5 and FIG. 6C. As shown in FIGS. 6B and 6C, movement of the slidable duct section 74 creates a gap 110 which allows the curved duct segment 76 to rotate and come into fluid communication with the fan stream inlet duct 80. When the curved duct segment 76 is in the position shown in FIG. 6C, fan stream air is supplied to the inlet of the gas generator 26.

When the actuator 84 rotates about the axis 82 away from the air inlet 70, the rotation of the actuator causes the curved duct segment 76 to rotate into the position shown in FIG. 4 and causes the slidable duct section 74 to slide over the duct 72 and into the position shown in FIG. 4 where the slidable duct section 74 is in communication with the curved duct segment 76 and the curved duct segment is out of contact with the fan stream inlet duct 80. In this position, free stream air is provided to the inlet of the gas generator 26.

The variable cycle intake 60 may include a particle separator 112 (see FIG. 3) which separates solid particles from the free air stream. The particle separator 112 may be provided with a first, upstream outlet that communicates with an internal channel 114 and a second downstream outlet 116 in the external lower aerodynamic surface 68. Particles within the free air stream tend not to follow the curvature of the intake 30 and continue on straight into the particle separator 112.

Figure 7:
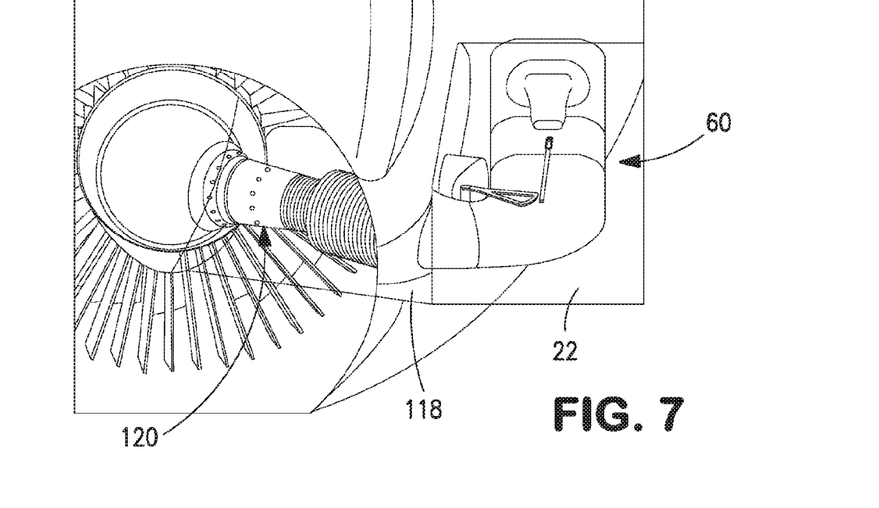
FIG. 7 is a rear view of the propulsion system showing the fairing blended into a bi fi wall.

As shown in FIG. 7, the aerodynamic fairing 22 may be blended into a bi-fi wall 118 surrounding the core 120 of the gas generator 26.

Figure 8:
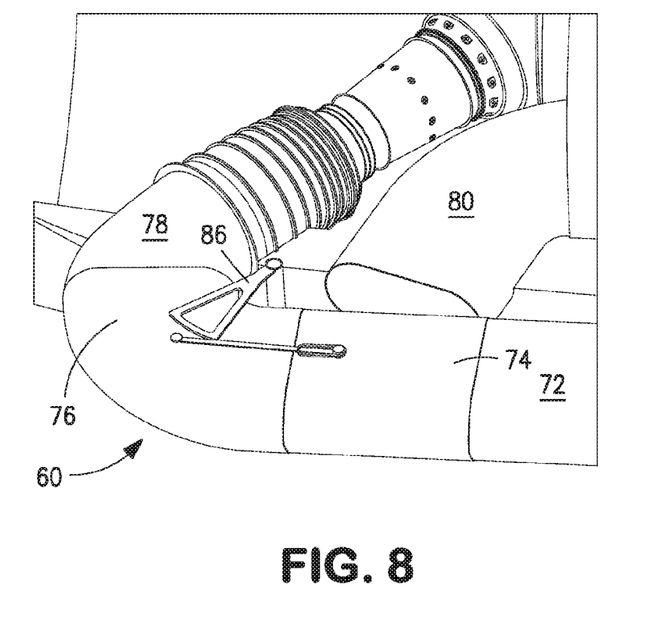
FIG. 8 illustrates the variable cycle intake in the first position.
Figure 10:
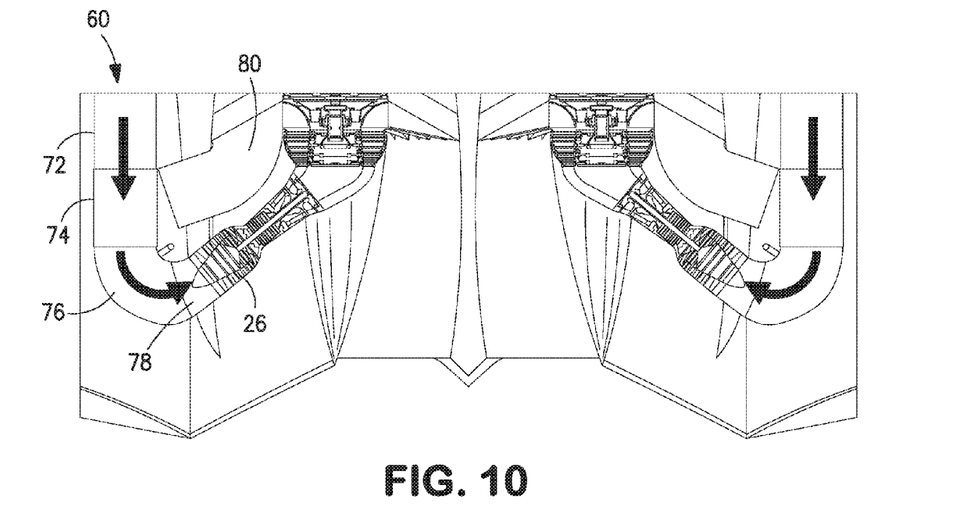
FIG. 10 illustrates the flow through the variable cycle intake when in the first position.

FIGS. 8 and 10 illustrate the variable cycle intake 60 in a first position where free air stream may be provided to a low pressure compressor section of the gas generator 26.

Figure 9:
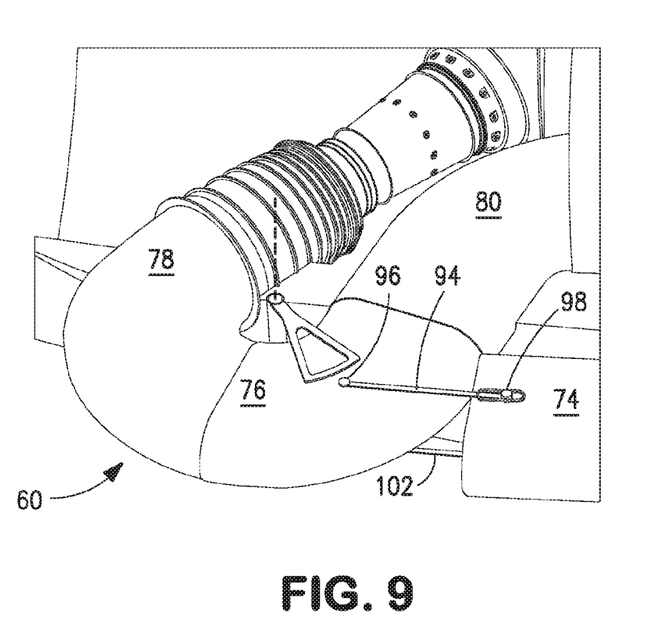
FIG. 9 illustrates the variable cycle intake in the second position.
Figure 11:
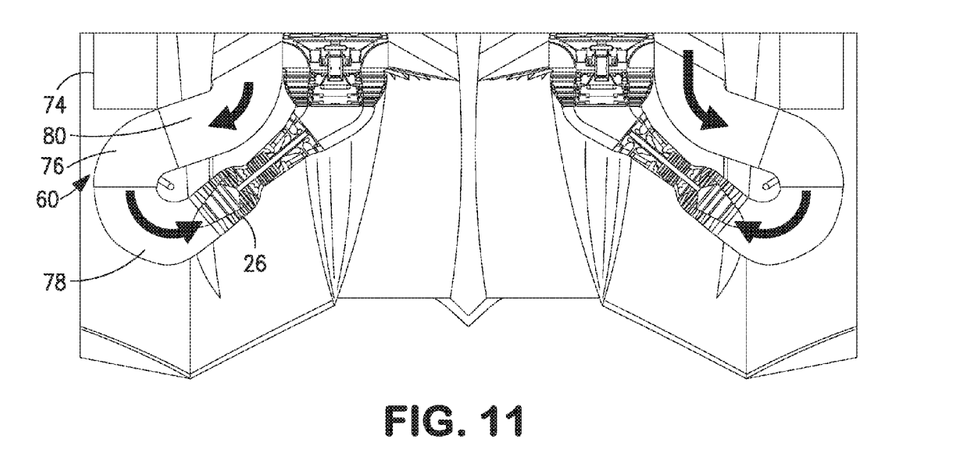
FIG. 11 illustrates the flow through the variable cycle intake when in the second position.

FIGS. 9 and 11 illustrate the variable cycle intake 60 in a second position where fan air stream may be provided to the low pressure compressor section of the gas generator 26.

Figure 12:
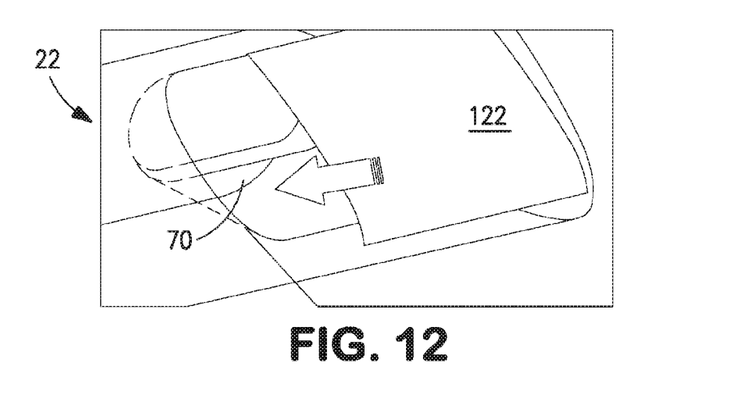
FIG. 12 illustrates a cover which can be slid over an air inlet of the variable cycle intake when not in use.

As shown in FIG. 12, a cover plate 122 may be provided within the fairing 22 to cover the free stream air inlet 70 when the variable cycle intake 60 is in the fan stream air position. An actuator (not shown) may be provided to slide the cover plate 122 over the air inlet 70.

The primary benefit of the variable cycle intake 60 is the dual cycle capability that it provides.

There has been provided in accordance with the present disclosure a variable cycle intake for a reverse core engine. While the variable cycle intake has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A gas generator for a reverse core propulsion system, comprising:
    a variable cycle intake for the gas generator; said variable cycle intake comprising a duct system; said duct system comprising
    a free stream air inlet;
    a straight duct extending from the free stream air inlet;
    a slidable duct connected to the straight duct;
    a fan stream air inlet duct;
    a curved duct segment having an inlet end and an outlet end; and
    an outlet duct section connecting the outlet end of the curved duct segment to the gas generator, said duct system being selectively disposed in a free air stream position and a fan air stream position, wherein a free stream air is fed to said gas generator by connecting said inlet end to said slidable duct when in said free air stream position and a fan stream air is fed to the gas generator by connecting said inlet end to said fan stream air inlet duct when in said fan air stream position.

2. The gas generator according to claim 1, wherein said slidable duct moves between the free air stream position where said slidable duct connects with said inlet end of said curved duct segment and the fan air stream position where said slidable duct is disconnected from said inlet end of said curved duct segment.

3. The gas generator according to claim 2, wherein said slidable duct surrounds a portion of said straight duct extending from the free stream air inlet.

4. The gas generator according to claim 1, wherein said curved duct segment surrounds a portion of said outlet duct section.

5. The gas generator according to claim 1, wherein said outlet duct section supplies one of the free stream air and the fan stream air to said gas generator.

6. The gas generator according to claim 5, wherein said outlet duct section is connected to an inlet of said gas generator.

7. The gas generator according to claim 1, wherein said curved duct segment is moved from the free air stream position in contact with said slidable duct and out of contact with said fan stream air inlet duct to the fan air stream position in contact with said fan stream air inlet duct and out of contact with said slidable duct.

8. The gas generator according to claim 7, further comprising an actuator to move said curved duct segment from said free air stream position to said fan air stream position and from said fan air stream position to said free air stream position.

9. The gas generator according to claim 8, wherein said actuator has a first arm connected to a first surface of said curved duct segment and a second arm connected to a second surface of said curved duct segment.

10. The gas generator according to claim 9, further comprising a first link connected to said first surface of said curved duct segment and to a first surface of said slidable duct and a second link connected to said second surface of said curved duct segment and to a second surface of said slidable duct to move said slidable duct as said curved duct segment moves.

11. The gas generator according to claim 1, further comprising a particle separator connected to said free stream air inlet.

12. The gas generator according to claim 1, further comprising a cover plate covering said free stream air inlet when said variable cycle intake is in said fan air stream position.

13. An aircraft comprising:
a fuselage having a tail section;
a pair of gas generators located in said tail section; each of said gas generators having a variable cycle intake supplying one of a free stream air and a fan stream air to a respective one of said pair of gas generators; and
said variable cycle intake comprising a duct system, said duct system comprising
a free stream air inlet;
a straight duct extending from the free stream air inlet;
a slidable duct connected to the straight duct;
a fan stream air inlet duct;
a curved duct segment having an inlet end and an outlet end; and
an outlet duct section connecting the outlet end of the curved duct segment to the gas generator, said duct system feeds the free stream air to the respective one of said pair of gas generators by connecting said inlet end to said slidable duct when in a free air stream position and feeds the fan stream air to the respective one of said pair of gas generators by connecting said inlet end to said fan stream air inlet duct when in a fan air stream position.

14. The aircraft according to claim 13, wherein said slidable duct moves between the free air stream position where said slidable duct connects with said inlet end of said curved duct segment and the fan air stream position where said slidable duct is disconnected from said inlet end of said curved duct segment.

15. The aircraft according to claim 14, wherein said slidable duct surrounds a portion of said straight duct extending from the free stream air inlet.

16. The aircraft according to claim 13, wherein said curved duct segment surrounds a portion of said outlet duct section.

17. The aircraft according to claim 13, wherein said outlet duct section supplies one of the free stream air and the fan stream air to said respective one of said pair of gas generators.

18. The aircraft according to claim 17, wherein each one of said pair of gas generators comprises a reverse core engine and said outlet duct section is connected to an inlet of said respective one of said gas generator.

19. The aircraft according to claim 13, wherein said curved duct segment is moved from the free air stream position in contact with said slidable duct and out of contact with said fan stream air inlet duct to the fan air stream position in contact with said fan stream air inlet duct and out of contact with said slidable duct.

20. The aircraft according to claim 19, wherein said duct system further comprises an actuator to move said curved duct segment from said free air stream position to said fan air stream position and from said fan air stream position to said free air stream position.

21. The aircraft according to claim 20, wherein said actuator has a first arm connected to a first surface of said curved duct segment and a second arm connected to a second surface of said curved duct segment.

22. The aircraft according to claim 21, wherein said duct system further comprises a first link connected to said first surface of said curved duct segment and to a first surface of said slidable duct and a second link connected to said second surface of said curved duct segment and to a second surface of said slidable duct to move said slidable duct as said curved duct segment moves.

23. The aircraft according to claim 13, wherein said duct system further comprises a particle separator connected to said free stream air inlet.

24. The aircraft according to claim 13, wherein said duct system further comprises a cover plate for covering said free stream air inlet when said variable cycle intake is in said second position.

25. The aircraft according to claim 13, wherein said duct system is at least partially embedded within an aerodynamic fairing.

26. The aircraft according to claim 13, further comprising a pair of free turbines and a pair of fans driven by said free turbines, wherein each one of said pair of gas generators provide air for driving a respective one of said pair of free turbines.

* * * * *